United States Patent

Dolman et al.

[11] Patent Number: 5,867,500
[45] Date of Patent: Feb. 2, 1999

[54] COMMUNICATIONS IN A DISTRIBUTION NETWORK

[75] Inventors: Graham Ainsley Dolman, Ickleton, Great Britain; Graeme Gibbs, Kanata, Canada; Gary Halfyard, Sawbridgeworth; Andrew John Booth, Thorley Park, both of Great Britain

[73] Assignee: Northern Telecom Limited, Montreal, China

[21] Appl. No.: 799,496

[22] Filed: Feb. 12, 1997

[30] Foreign Application Priority Data

Feb. 12, 1996 [GB] United Kingdom .................. 9602808

[51] Int. Cl.$^6$ ....................................................... H04J 3/13
[52] U.S. Cl. ........................... 370/443; 370/395; 370/458; 370/474
[58] Field of Search ..................................... 370/458, 347, 370/348, 349, 350, 336, 337, 389, 395, 474, 443

[56] References Cited

U.S. PATENT DOCUMENTS

| | | |
|---|---|---|
| 4,346,470 | 8/1982 | Alvarez, III et al. .................. 370/324 |
| 5,353,285 | 10/1994 | Van Der Plas et al. ................. 370/443 |
| 5,425,027 | 6/1995 | Baran ...................................... 370/395 |
| 5,648,958 | 7/1997 | Counterman ............................ 370/458 |
| 5,666,358 | 9/1997 | Paratore et al. ........................ 370/347 |
| 5,719,858 | 2/1998 | Moore .................................... 370/347 |

*Primary Examiner*—Chi H. Pham
*Assistant Examiner*—W. Todd Baker
*Attorney, Agent, or Firm*—Lee, Mann, Smith, McWilliams, Sweeney & Ohlson

[57] ABSTRACT

In an arrangement for transmitting traffic in asynchronous transfer mode (ATM) cells in downstream and upstream frames between an out station and a base station, upstream traffic cells are queued in each outstation in sequential order for subsequent transmission in upstream frames to the base station. Each outstation sends requests for allocation of timeslots to the base station, each said allocation request being transmitted to the base station in a respective time slot of a said upstream frame. The base station includes means for performing a periodic ranging measurement with each outstation whereby to determine a corresponding timing offset between the base station and that outstation and for communicating that timing offset to the outstation. Each outstation controls the timing of its cell allocation requests such that the cell allocation requests received by the base station in each upstream frame are each in a respective predetermined time slot of that frame. This avoids the need for a preamble sequence to be provided with each request.

9 Claims, 4 Drawing Sheets

COMMUNICATIONS IN A DISTRIBUTION NETWORK

This invention relates to communications in a distribution network, and more particularly to bidirectional communications in a distribution network in which a central or distribution station communicates with a plurality of remote terminals.

BACKGROUND OF THE INVENTION

Distribution networks, for example cable television distribution networks, are well known. In such networks, analog television signals are carried to customer terminals (television receivers) from a central station or head end via a branched coaxial cable which includes bridger amplifiers, line extenders, and customer taps. Each television signal occupies a typically 6 to 8 MHz channel at a frequency from about 50 MHz to about 750 MHz or more. The upper frequency is limited by the bandwidth of the bridger amplifiers and line extenders and the attenuation of the coaxial cable, which as is well known increases with increasing frequency. Various ways have been proposed for communicating additional signals via a cable television distribution network, typically involving the supply of such signals via optical fibres to appropriate points in the coaxial cable system with delivery of the signals to the customer premises via the coaxial cable, referred to as the drop cable, positioned between the customer tap to the customer premises. There is also a need to accommodate signals in the upstream direction from the customer premises to the central station, so that the network can then serve for communicating arbitrary types of signals in both direction. Such signals can include for example television program selection and control signals, metering signals, voice signals, and data signals.

In the downstream direction from the central station to the terminals, the cable distribution network constitutes a point to multipoint network, on which signal transmission is relatively easy to provide. In the upstream direction from the terminals to the central station, this network is a multipoint-to-point network, on which signal transmission is much more difficult to provide. One reason for the difficulty is the problem of contention among different terminals simultaneously wishing to transmit signals to the central station. Various collision detection schemes have been proposed generally for multipoint-to-point communications networks; these are not particularly suited to the cable distribution network, especially in view of the large number of terminals which may exist in such a network.

In addition, there can be a wide variation in the bandwidth which is required by each terminal, at any particular time, for transmitting signals in the upstream direction. For example, these signals can be isochronous (constant bit rate) signals, such as voice, metering, and video signals, and/or asynchronous (variable bit rate) signals, such as computer data signals, keyboard operations, and television push-button control signals. Providing for efficient transmission of these different types of signals from a large number of terminals is difficult.

In the past, systems of this type have generally employed a conventional TDMA protocol for the upstream transmission. In such an arrangement, a station wishing to transmit is allocated a time slot by the central station and occupies this time slot throughout the length of the transmission. This arrangement is however less than ideal as some of the terminals will have more data to transmit than can be easily accommodated in a single time slot wherein other terminals may have so little data that the occupied time slot is underused.

The data that is to be transmitted from customer terminal is generally of an asynchronous nature and it has been suggested that an asynchronous transfer mode (ATM) protocol would be more effective in terms of efficiency of use of the available bandwidth. The introduction of ATM techniques to this particular application has however been limited by the lack of an efficient marshalling scheme. In particular, a customer terminal transmitting ATM cells will in general be allocated different time slots in each frame and will thus need to send a transmission request to the central station for every cell that is to be transmitted. The present techniques that are available for sending such requests consume a significant proportion of the available upstream bandwidth thus reducing the bandwidth available for carrying traffic and limiting the operational efficiency of the system.

SUMMARY OF THE INVENTION

An object of the invention is to minimise or to overcome this disadvantage.

It is a further object of the invention to provide an improved arrangement and method for transmitting traffic in a distribution system.

According to one aspect of the invention there is provided a method of transmitting traffic contained in asynchronous transfer mode (ATM) cells in downstream and upstream frames between an out station and a base station, the method including providing the outstation with a measure of its timing offset from the base station, sending requests for allocations of time slots in upstream frames for ATM cells to be transmitted from the outstation to the base station, and timing the cell allocation requests from measured offset such that the cell allocation requests received by the base station in upstream frames are each request being in a respective predetermined time slot of that frame.

According to another aspect of the invention there is provided a method of transmitting traffic contained in asynchronous transfer mode (ATM) cells in downstream and upstream frames between an out station and a base station, the method including assembling traffic at the outstation into ATM cells and queuing said cells for transmission in upstream frames to the base station, sending to the base station requests for allocation of time slots for sending said cells to the base station, each said allocation request being transmitted to the base station in a respective time slot of a said upstream frame, and responding at the base station to said requests with corresponding time slot allocations, wherein the base station performs a periodic ranging measurement with each said outstation whereby to determine a corresponding timing offset between the base station and that outstation, and wherein each said outstation is updated with its respective timing offset whereby to control the timing of its cell allocation requests such that the cell allocation requests received by the base station in each upstream frame are each in a respective predetermined time slot of that frame.

According to another aspect of the invention there is further provided an arrangement for transmitting traffic contained in asynchronous transfer mode (ATM) cells in downstream and upstream frames between an out station and a base station, the arrangement including means for assembling traffic at the outstation into ATM cells, a buffer store queuing said cells in sequential order for subsequent transmission in upstream frames to the base station, request means disposed at the outstation for sending to the base station requests for allocation of time slots for sending said cells to the base station, each said allocation request being transmitted to the base station in a respective time slot of a said upstream frame, and allocation means disposed at the base station for responding to said requests with corresponding time slot allocations, wherein the base station includes means for performing a periodic ranging measurement with each said outstation whereby to determine a corresponding timing offset between the base station and that outstation and for communicating that timing offset to the outstation, and wherein each said outstation has means responsive to its measured timing offset for controlling the timing of its cell allocation requests such that the cell allocation requests received by the base station in each upstream frame are each in a respective predetermined time slot of that frame.

By providing the cell allocation requests at a precisely defined time at the base station, there is no requirement for a preamble sequence to identify the sender and to identify the timing slip. This increases the speed of the process and removes the need for storage and recovery of large amounts of user data at the base station.

In a preferred arrangement, each outstation is allocated slots in alternate upstream frames.

Preferably, the upstream transmission employs a differential quadrature phase shift keying DQPSK protocol. Each cell allocation request typically comprises a burst of three DQPSK symbols.

Advantageously, the ranging measurement is performed via a control subframe incorporated in the downstream frames.

An embodiment of the invention will now be described with reference to the accompanying drawings, in which.

Figure 1:
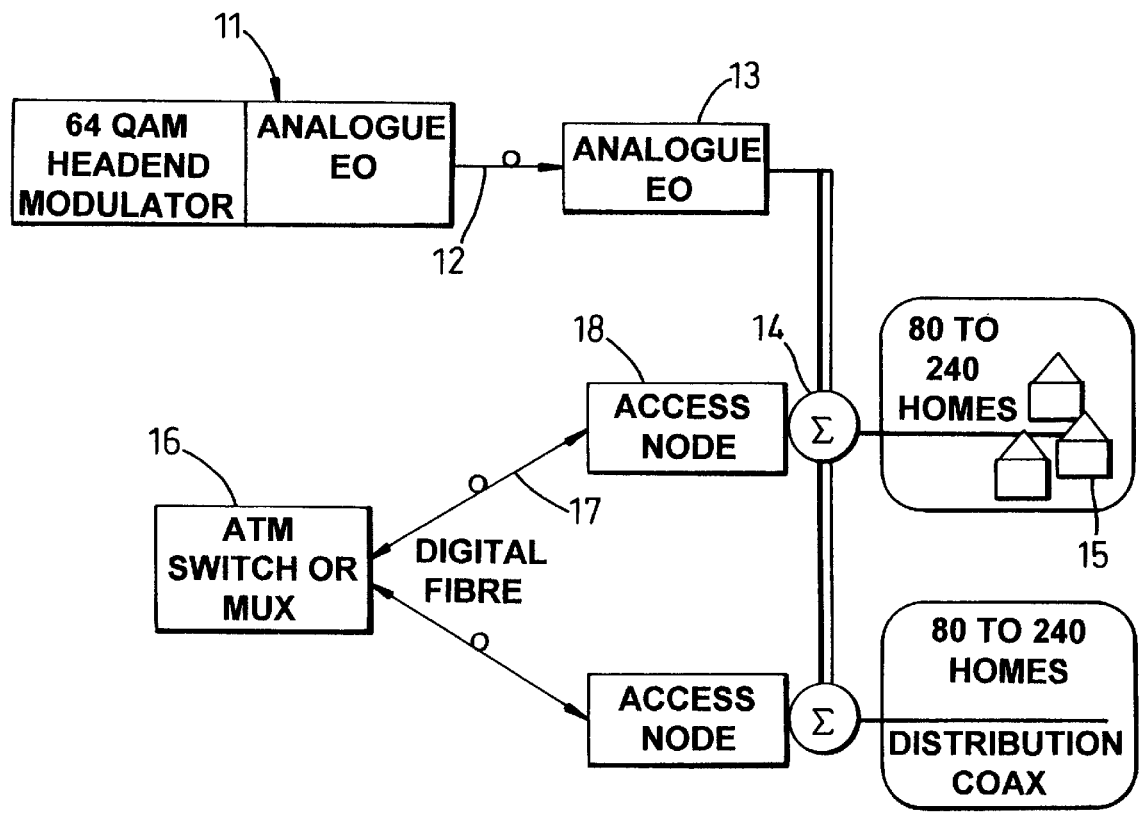
FIG. 1 illustrates a cable television distribution network which provides bidirectional communications in accordance with an embodiment of this invention.

Referring to FIG. 1, the communications system includes a head end 11 coupled with a fibre Link 12 to an interface unit 13 serving several coax nodes 14 via a coaxial connection. Each node 14 serves a group of customer terminals 15, typically between 80 and 240, via a coaxial distribution network. The head end 11 provides analogue services such as cable television to the customer terminals via the distribution network.

Interactive services are provided to customer terminals via an ATM switch or MUX 16 coupled to an ATM network (not shown). The ATM switch is coupled to the coax node 14 via respective fibre links 17 and access node 18. All traffic for these interactive services, both upstream and downstream, flows through the respective access node.

Each coax node 14 communicates with its respective group of customer terminals via the coaxial network which thus provides a common bus. In the downstream direction the communication is point to multipoint, whereas in the upstream direction communication is multipoint to point.

In this arrangement each access node 18 functions as a local base station and the customer terminals served by node function as outstations.

Figure 2:
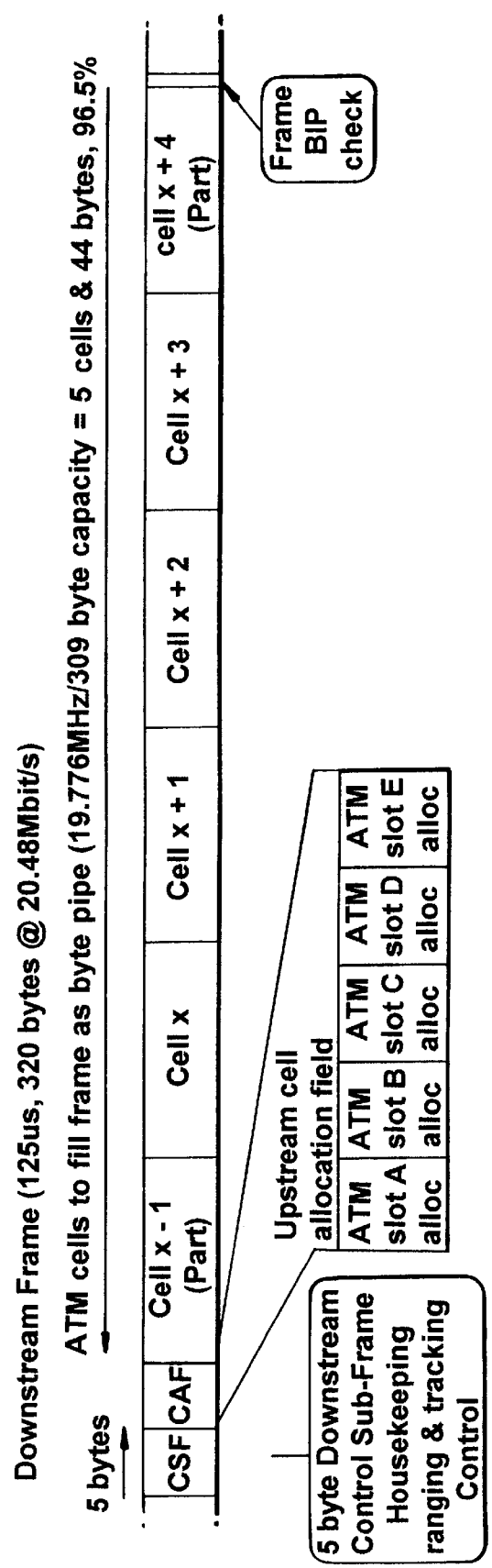
FIG. 2 illustrates a TDM frame structure for downstream signal in the system of FIG. 1.
Figure 3:
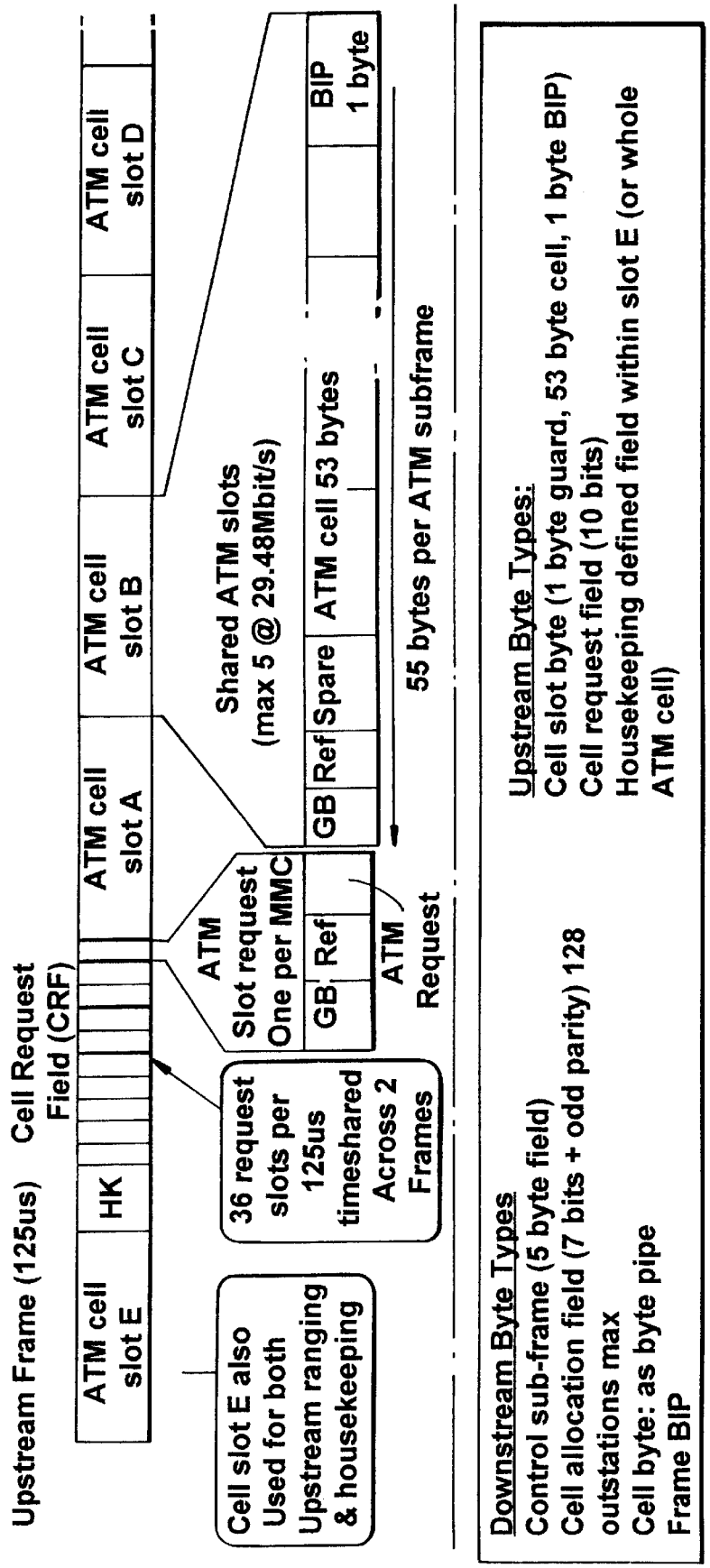
FIG. 3 illustrates a corresponding TDM frame structure for upstream signals.

As illustrated in FIGS. 2 and 3, communications traffic is carried in frames. Each downstream frame (FIG. 2) incorporates a number of ATM cells carrying traffic to the customer terminal, a five byte control subframe (CSF) included for housekeeping purposes and which is also used for ranging and for tracking control, and a CAF field containing a series of ATM slot allocations which provide authorisation for transmission of cells by the customer station via the corresponding ATM cell slots of the subsequent upstream frame (FIG. 3). A frame BIP check field is also provided to identify transmission errors that may occur.

The upstream frame incorporates a header portion (cell slot E) which is used for upstream ranging and for housekeeping purposes, and a number of upstream ATM cell slots which have been allocated to customer terminals. The frame also includes a number (typically 36) of cell request slots which are sent by the customer terminals to request allocation of a slot in a subsequent downstream frame. Typically each frame occupies 125 microseconds giving a cycle time of 250 microseconds.

It will be seen from FIGS. 2 and 3 that the downstream transmission uses a TDM format while the upstream transmission uses a modified TDMA format in which customer terminals are allocated respective time slots but for that frame only. In a subsequent frame a "customer terminal" will in general be allocated a different slot or, on some occasions, will receive no allocation at all and will have to wait for an allocation in a later frame.

Figure 4:
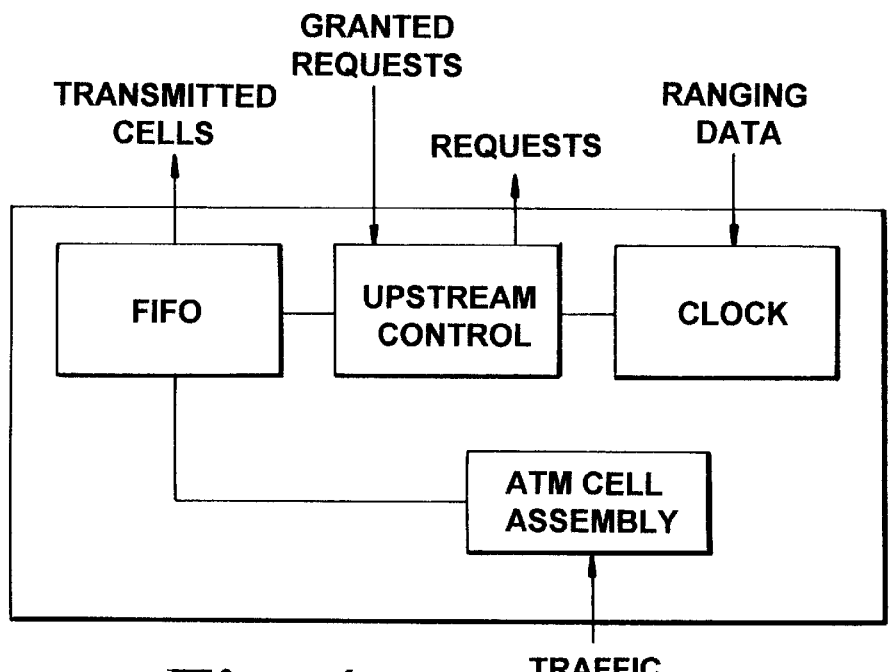
FIG. 4 is a schematic diagram of the customer terminal station of the system of FIG. 1.

In the customer terminal shown in FIG. 4, outgoing or customer traffic, e.g. video, voice or data traffic, is packed into ATM cells, each of which is provided with an appropriate header. These cells are then stored in sequential order in a FIFO buffer store to await transmission to the central station. Before a cell can be transmitted, the customer terminal sends a cell transmission request to the central station in response to a polling signal and is thus offered time slots in alternate upstream frames in response to its allocation requests. In a preferred embodiment, each station is polled during alternate downstream frames. In this embodiment, one half of the customer stations are polled in the even downstream frames and the other half in the odd downstream frames.

For simplicity, only the relevant parts of the upstream transmission portion of the customer terminal has been shown in FIG. 4. This transmission request signal comprises a short burst containing only a few symbols and having no preamble or timing sequence.

Advantageously, the signalling between the customer terminal and the access node employs a differential quadrature phase shift keying (DQPSK) protocol. The request signal burst may comprise e.g. three DQPSK symbols which carry the request information in the form of two intersymbol transitions. This cell allocation signal burst is sent at a precisely defined time which is determined by the access node as will be discussed below. Successive bursts are separated by a short guard band.

Figure 5:
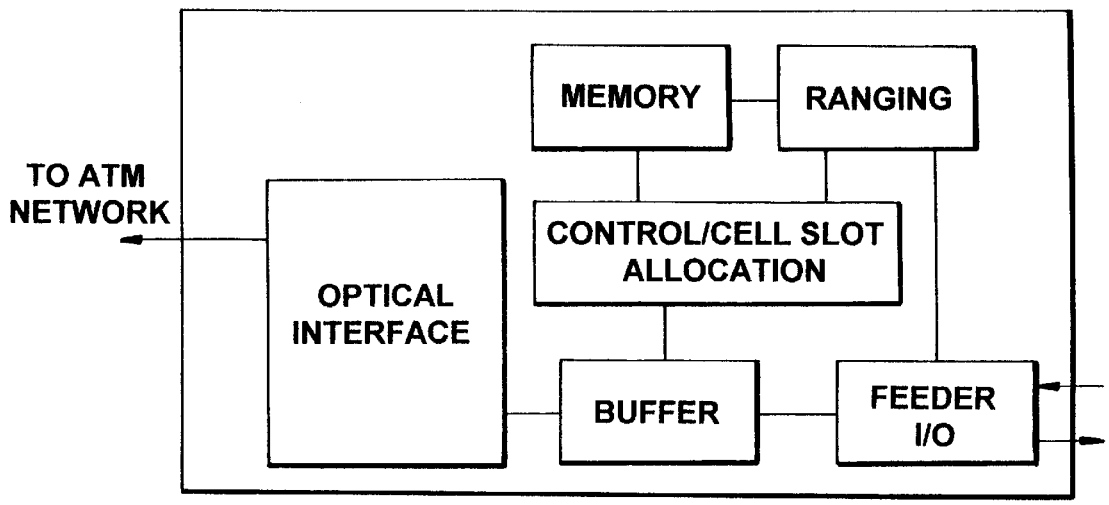
FIG. 5 is a schematic diagram of the access node equipment of the system of FIG. 1.

As shown in FIG. 5, the access node provides an optical interface to the ATM network (not shown) and controls the allocation of available upstream time slots in response to requests received via the feeder input/output circuit. The access node also incorporates ranging equipment for determining its effective distance from every customer terminal that it serves. Details of the served terminals are stored in a memory.

The call allocation request sent by a customer terminal to the access node may be a request for a single cell or for a number of cells depending on the length of the queue of cells awaiting transmission from that base station. Depending on the density of traffic within the system, the access node may be able to respond to a request for a number of cells with a corresponding number of allocations, or it may be able to fulfil only a smaller number of allocations in which case the remainder of the request will be fulfilled in one or more subsequent frames.

It will be appreciated that in a cable system, each terminal will have an effective time shift from the access node as a result of the electrical length of the coaxial transmission path therebetween. Also, the effective length of the path can vary in response to the transmission characteristics of the path. To overcome this, the access node (FIG. 4) performs a regular ranging measurement via the CSF slot of the downstream frame to each terminal in its service area so as to determine the timing offset of that terminal from the access node. Typically, each customer terminal has a ranging measurement performed every few seconds. This timing offset information is downloaded into a ranging data memory in the customer terminal and correspond customer data is stored in a memory in the access node. This data is used by an upstream control circuit in the customer terminal to time transmission of cell slot allocation requests to the correct position of the upstream frame such that the allocation requests received from customer terminals at the access node are in the correct sequence and in the correct time slots within the upstream frame. From the stored customer data, the access node can then readily identify the origin of each cell allocation request and can decode the request without the need for the provision of any identifying preamble sequence. This significantly reduces the time required for request processing as there is a reduction in the amount of overhead data in the frame and there is no requirement for storage at the access node of customer identifying preamble sequences.

Although the communications system has been described above with particular reference to a cable TV system, it will be appreciated that it is by no means limited to that particular application and that it is of general application to systems employing ATM transmissions to and from terminal stations.

We claim:

1. A method of transmitting traffic contained in asynchronous transfer mode (ATM) cells in downstream and upstream frames between an out station and a base station, the method including assembling traffic at the outstation into ATM cells and queuing said cells for transmission in upstream frames to the base station, sending to the base station requests for allocation of time slots for sending said cells to the base station, each said allocation request having no preamble and being transmitted to the base station in a respective time slot of a said upstream frame, and responding at the base station to said requests with corresponding time slot allocations, each said slot allocation being for one subsequent upstream frame only, wherein the base station performs a periodic ranging measurement with each said outstation whereby to determine a corresponding timing offset between the base station and that outstation, and wherein each said outstation is updated with its respective timing offset whereby to control the timing of its cell allocation requests such that the cell allocation requests received by the base station in each upstream frame are each in a respective predetermined time slot of that frame such that the time of receipt of a said allocation request at the base station identifies the terminal from which that request originated.

2. A method as claimed in claim 1, wherein each said outstation is allocated slots in alternate upstream frames.

3. A method as claimed in claim 2, wherein the upstream transmission employs a differential quadrature phase shift keying DQPSK protocol.

4. A method as claimed in claim 3, wherein each said cell allocation request comprises a burst of three DQPSK symbols.

5. A method as claimed in claim 4, wherein said ranging is performed via a control subframe incorporated in the downstream frames.

6. A method as claimed in claim 5, wherein each said outstation transmits its requests for allocation of time slots in response to a polling signal from the base station.

7. An arrangement for transmitting traffic contained in asynchronous transfer mode (ATM) cells in downstream and upstream frames between an out station and a base station, the arrangement including means for assembling traffic at the outstation into ATM cells, a buffer store arranged to queue said cells in sequential order for subsequent transmission in upstream frames to the base station, request means disposed at the outstation for sending to the base station requests for allocation of time slots for sending said queued cells to the base station, each said allocation request baying no preamble and being transmitted to the base station in a respective time slot of a said upstream frame, and allocation means disposed at the base station for responding to said requests with corresponding time slot allocations, each said slot allocation being for one subsequent upstream frame only, wherein the base station includes means for performing a periodic ranging measurement with each said outstation whereby to determine a corresponding timing offset between the base station and that outstation and for communicating that timing offset to the outstation, and wherein each said outstation has means responsive to its measured timing offset for controlling the timing of its cell allocation requests such that the cell allocation requests received by the base station in each upstream frame are each in a respective predetermined time slot of that frame such that the time of receipt of a said allocation request at the base station identifiesthe terminal from which that request originated.

8. An arrangement as claimed in claim 7, wherein said ranging is performed via a control subframe incorporated in the downstream frames.

9. An arrangement as claimed in claim 8, wherein each said outstation has means for transmitting its requests for allocation of time slots in response to a polling signal from the base station.

* * * * *